(12) United States Patent
Kim

(10) Patent No.: US 11,924,658 B2
(45) Date of Patent: Mar. 5, 2024

(54) METHOD AND APPARATUS FOR RADIO LINK MONITORING FOR MULTIPLE ACTIVE BANDWIDTH PARTS IN A WIRELESS COMMUNICATION SYSTEM

(71) Applicant: LG ELECTRONICS INC., Seoul (KR)

(72) Inventor: Sangwon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 227 days.

(21) Appl. No.: 17/385,396

(22) Filed: Jul. 26, 2021

(65) Prior Publication Data

US 2022/0038926 A1 Feb. 3, 2022

(30) Foreign Application Priority Data

Jul. 30, 2020 (KR) .......................... 10-2020-0095344

(51) Int. Cl.
*H04W 72/04* (2023.01)
*H04W 24/08* (2009.01)
*H04W 72/0453* (2023.01)
*H04W 72/23* (2023.01)
*H04W 72/56* (2023.01)

(52) U.S. Cl.
CPC ....... *H04W 24/08* (2013.01); *H04W 72/0453* (2013.01); *H04W 72/23* (2023.01); *H04W 72/56* (2023.01)

(58) Field of Classification Search
None
See application file for complete search history.

(56) References Cited

U.S. PATENT DOCUMENTS

| | | | |
|---|---|---|---|
| 11,510,081 B2* | 11/2022 | Cheng | H04W 48/16 |
| 2020/0053613 A1* | 2/2020 | Cirik | H04L 5/001 |
| 2020/0235898 A1* | 7/2020 | Loehr | H04W 74/0808 |
| 2020/0274678 A1* | 8/2020 | Lin | H04L 5/0092 |
| 2020/0280421 A1* | 9/2020 | Choi | H04L 5/0048 |
| 2020/0351066 A1* | 11/2020 | Cirik | H04L 5/0098 |
| 2021/0014894 A1* | 1/2021 | Li | H04W 72/1273 |
| 2021/0029768 A1* | 1/2021 | Shih | H04W 76/18 |
| 2021/0144760 A1* | 5/2021 | Ozturk | H04W 16/14 |

(Continued)

OTHER PUBLICATIONS

Section 4.4.5 of 3GPP TS 38.211 V15.7.0.
Section 5.3.10 of 3GPP TS 38.331 V16.0.0.
Section 5 of 3GPP TS 38.213 V16.1.0.

*Primary Examiner* — Sai Aung
(74) *Attorney, Agent, or Firm* — BRYAN CAVE LEIGHTON PAISNER LLP

(57) ABSTRACT

A method and apparatus for Radio Link Monitoring for multiple active bandwidth parts in a wireless communication system is provided. A wireless device receives a BWP configuration including information on (i) multiple BWPs, and (ii) a priority for the multiple BWPs. A wireless device activates a first BWP and a second BWP among the multiple BWPs. A wireless device performs RLM procedure only for the first BWP which has been determined as a primary active BWP. A wireless device determines to change the primary active BWP from the first BWP to the second BWP upon detecting a BWP failure for the first BWP. A wireless device performs RLM procedure for the second BWP which is selected as the primary active BWP.

9 Claims, 14 Drawing Sheets

(56) References Cited

U.S. PATENT DOCUMENTS

| | | | |
|---|---|---|---|
| 2021/0274514 A1* | 9/2021 | Li | H04W 72/0453 |
| 2021/0328650 A1* | 10/2021 | Awad | H04B 7/088 |
| 2021/0385896 A1* | 12/2021 | Kim | H04W 36/0027 |
| 2022/0110153 A1* | 4/2022 | Wu | H04W 74/0808 |

* cited by examiner

Contiguous BWPs configured for UE

Non-contiguous BWPs configured for UE

METHOD AND APPARATUS FOR RADIO LINK MONITORING FOR MULTIPLE ACTIVE BANDWIDTH PARTS IN A WIRELESS COMMUNICATION SYSTEM

CROSS-REFERENCE TO RELATED APPLICATIONS

Pursuant to 35 U.S.C. § 119 (a), this application claims the benefit of Korean Patent Application No. 10-2020-0095344, filed on Jul. 30, 2020, the contents of which are all hereby incorporated by reference herein in their entirety.

BACKGROUND

Technical Field

The present disclosure relates to a method and apparatus for Radio Link Monitoring for multiple active bandwidth parts in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR is a technology that operates on a very wideband compared with LTE. In order to support flexible broadband operation, NR has the following design principles different from LTE in terms of broadband support.

The ability of the network and the user equipment (UE) to support the bandwidth may be different.

The bandwidth capabilities of the downlink and uplink supported by the UE may be different.

The capabilities of the bandwidths supported by each UE may differ, so that UEs supporting different bandwidths may coexist within one network frequency band.

In order to reduce the power consumption of the UE, the UE may be configured with different bandwidth depending on the traffic load state of the UE, etc.

In order to satisfy the above-mentioned design principles, NR newly introduced a concept of bandwidth part (BWP) in addition to carrier aggregation (CA) of existing LTE.

SUMMARY

If a single bandwidth part (BWP) is activated, a wireless device may perform radio link monitoring (RLM) for the single active BWP. A wireless device may declare the radio link failure (RLF) and initiate the recovery procedure (for example, RRC re-establishment), when the wireless device detects the radio link problem for the active BWP.

It may be supported to activate multiple BWPs. When multiple BWPs are activated, a wireless device may need to perform RLM for each activated BWP. If a wireless device declares the RLF when the radio link problem is detected from an active BWP (for example, first active BWP), even though there is another available active BWP (for example, second active BWP), the wireless device will undergo unnecessary service interruption due to the recovery procedure whenever the radio link problem happens within a single BWP.

Therefore, studies for Radio Link Monitoring for multiple active bandwidth parts in a wireless communication system are required.

In an aspect, a method performed by a wireless device in a wireless communication system is provided. A wireless device receives a Bandwidth Part (BWP) configuration including information on (i) multiple BWPs, and (ii) a priority for the multiple BWPs. A wireless device activates a first BWP and a second BWP among the multiple BWPs. A wireless device performs Radio Link Monitoring (RLM) procedure only for the first BWP which has been determined as a primary active BWP. A wireless device determines to change the primary active BWP from the first BWP to the second BWP upon detecting a BWP failure for the first BWP. A wireless device performs RLM procedure for the second BWP which is selected as the primary active BWP.

In another aspect, an apparatus for implementing the above method is provided.

The present disclosure can have various advantageous effects.

According to some embodiments of the present disclosure, a wireless device could perform Radio Link Monitoring (RLM) for multiple active bandwidth parts efficiently.

For example, when more than one BWPs are activated, the power consumption required for RLM could be minimized by performing the RLM only for the primary active BWP.

For example, when the link problem is detected from an active BWP, a wireless device may not need to initiate the recovery procedure, for example, RRC re-establishment, by changing the primary active BWP.

For example, a wireless device may inform the network of the problem so that new active BWP can be configured for the wireless device by network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
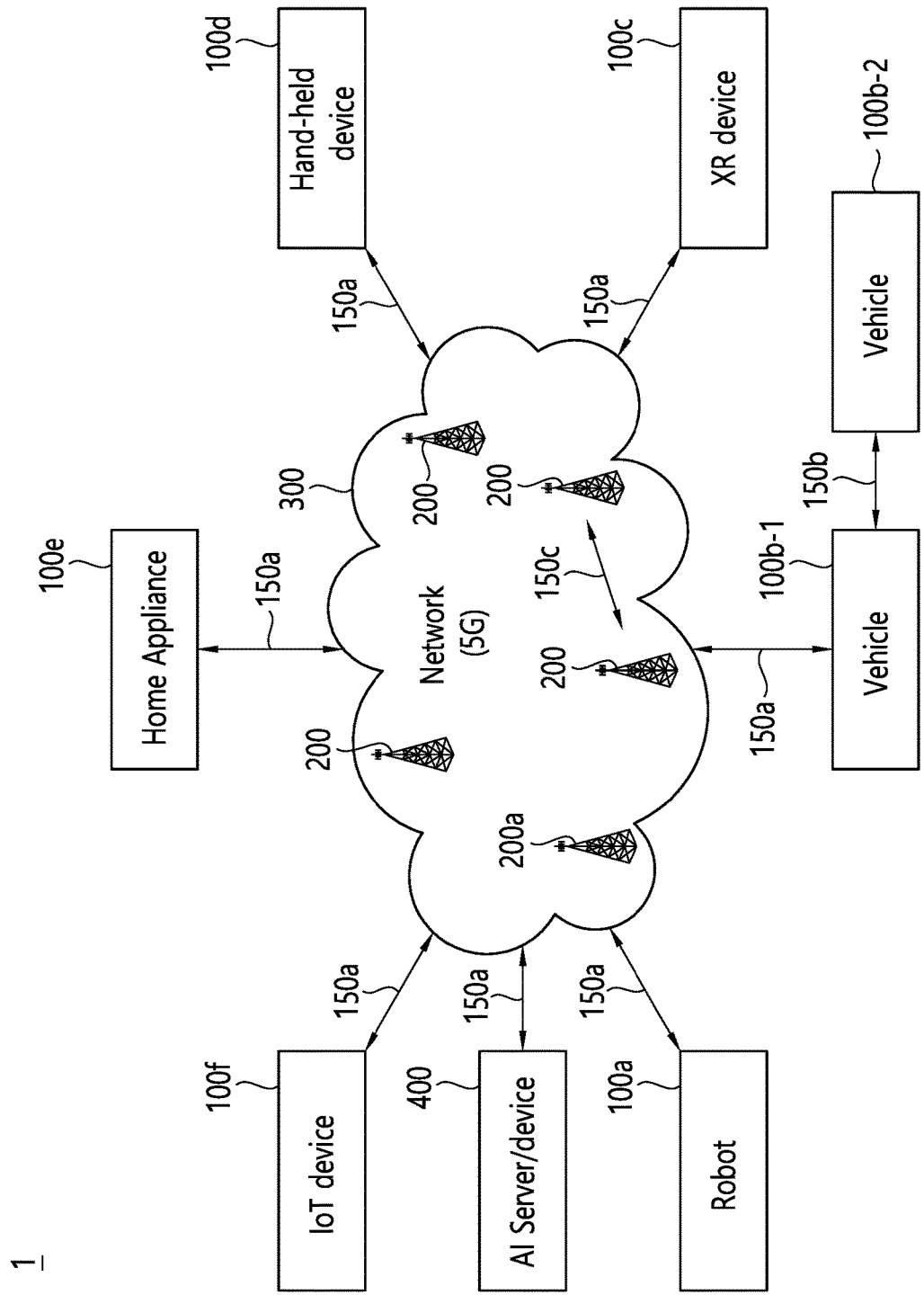
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs 01-DMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
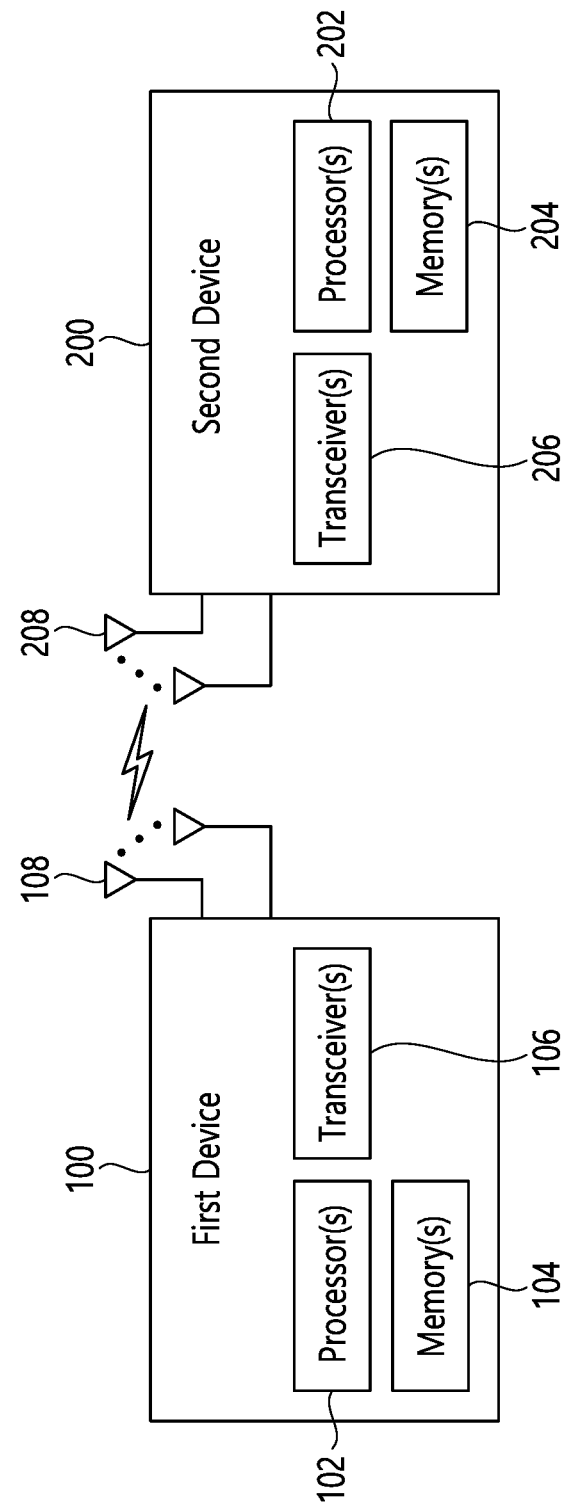
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
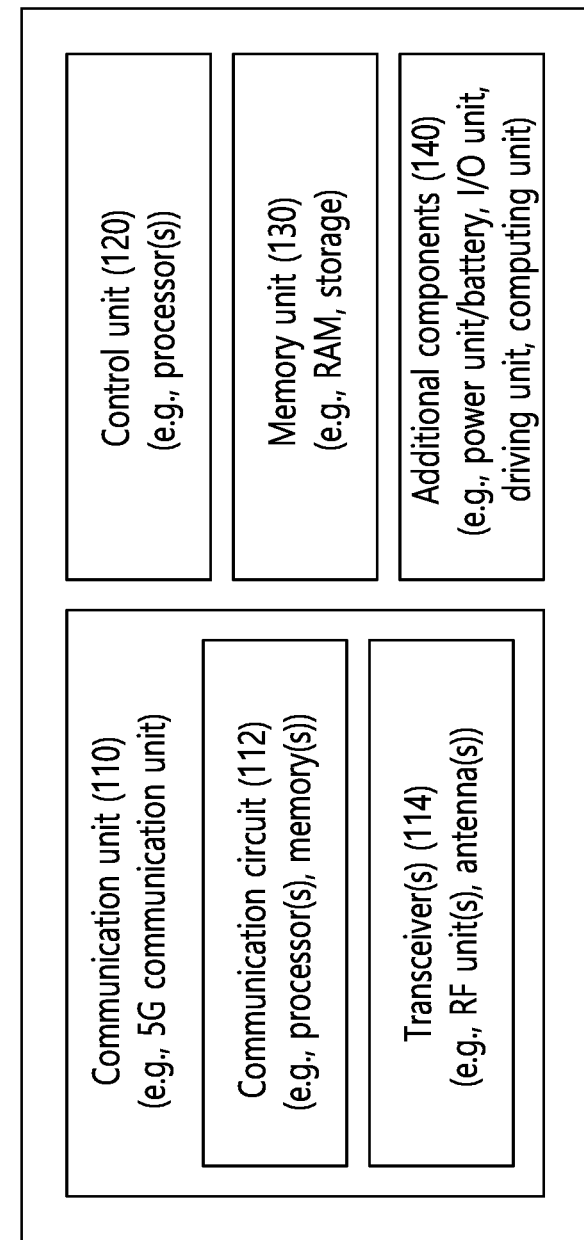
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
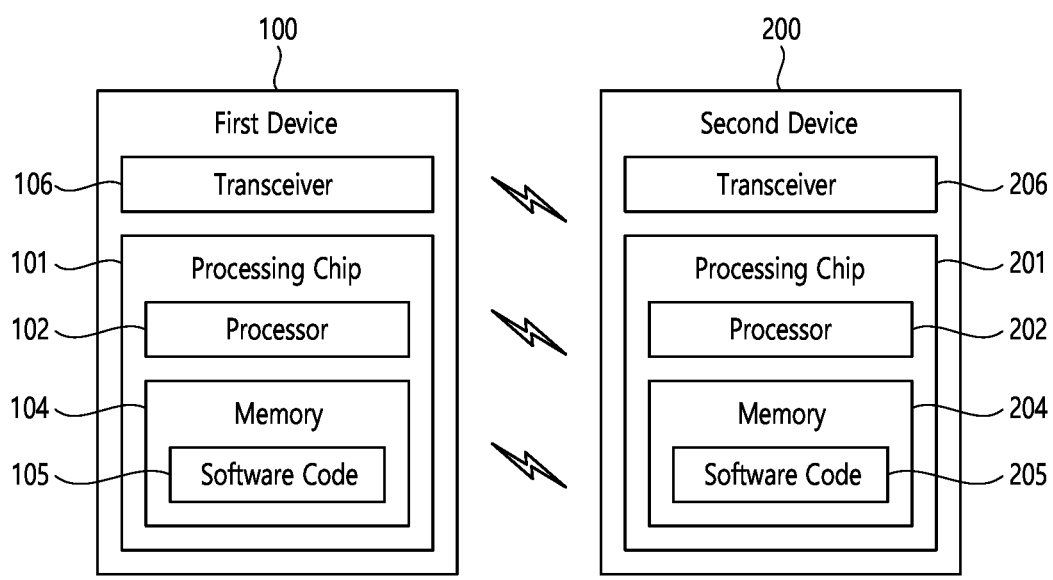
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
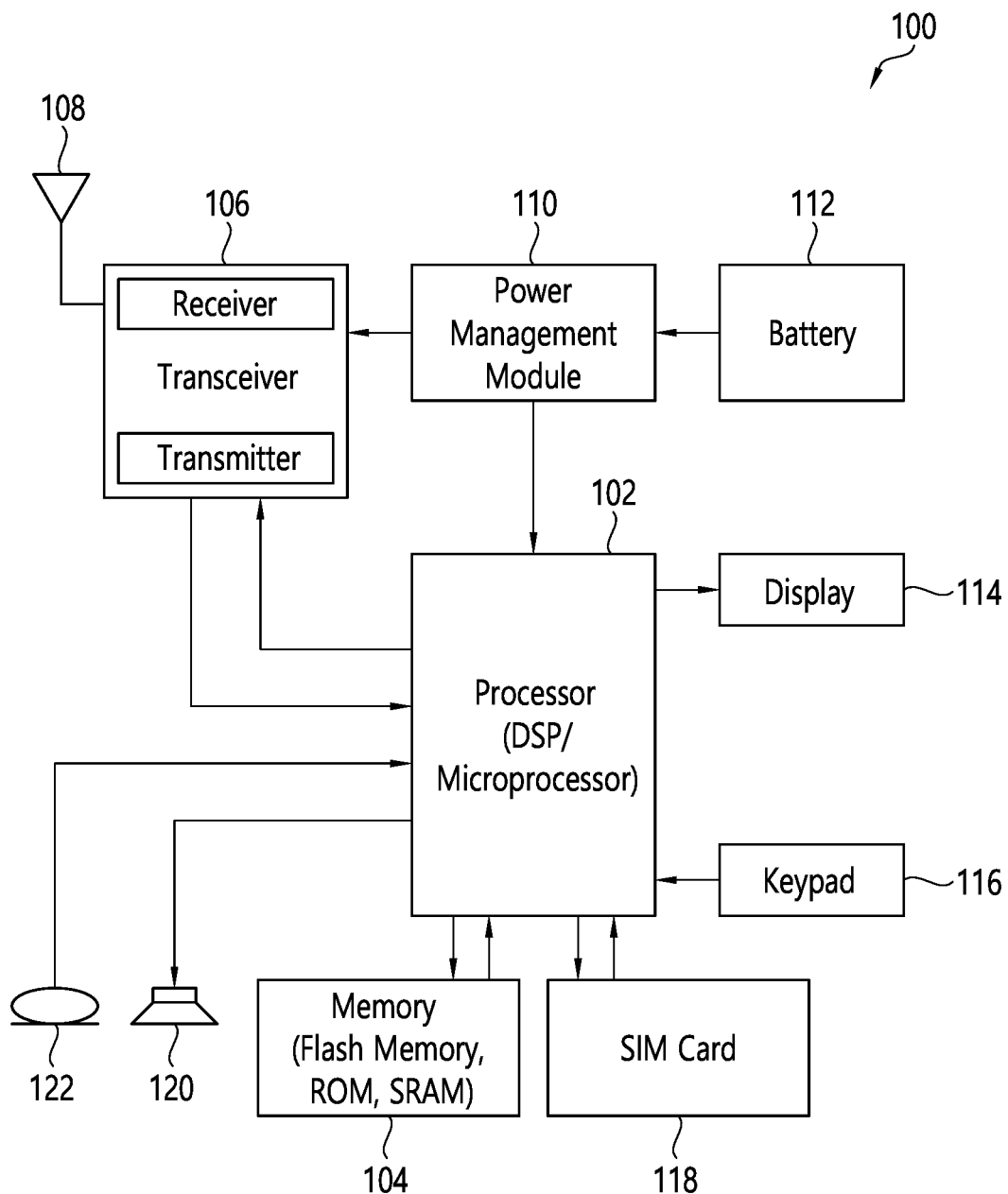
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
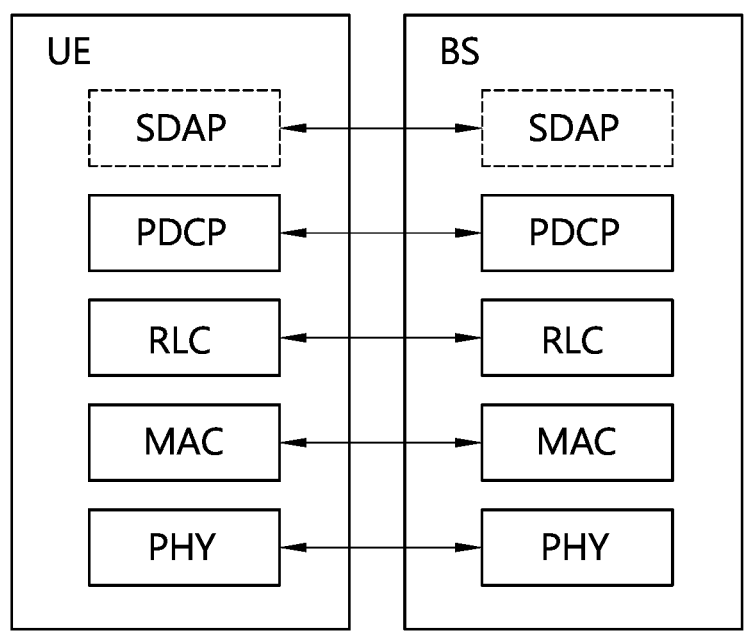
FIGS. 6 and 7 show an example of protocol stacks in a 3GPP based wireless communication system to which implementations of the present disclosure is applied.
Figure 7:
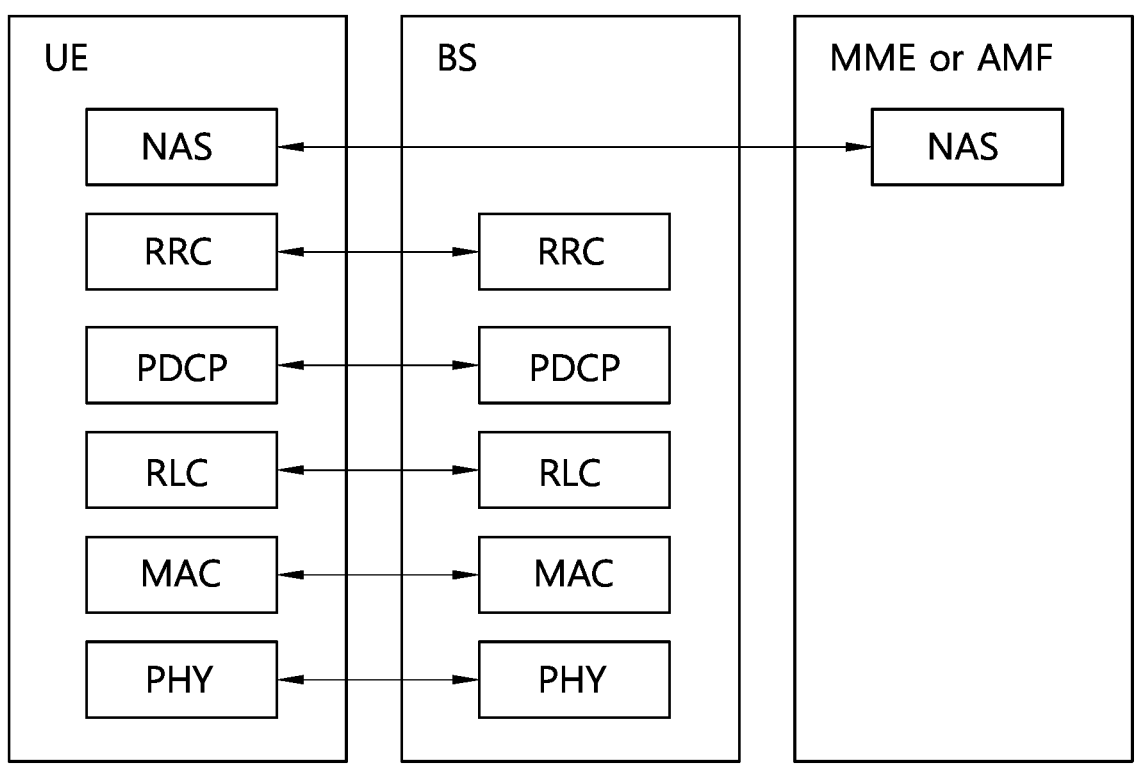

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
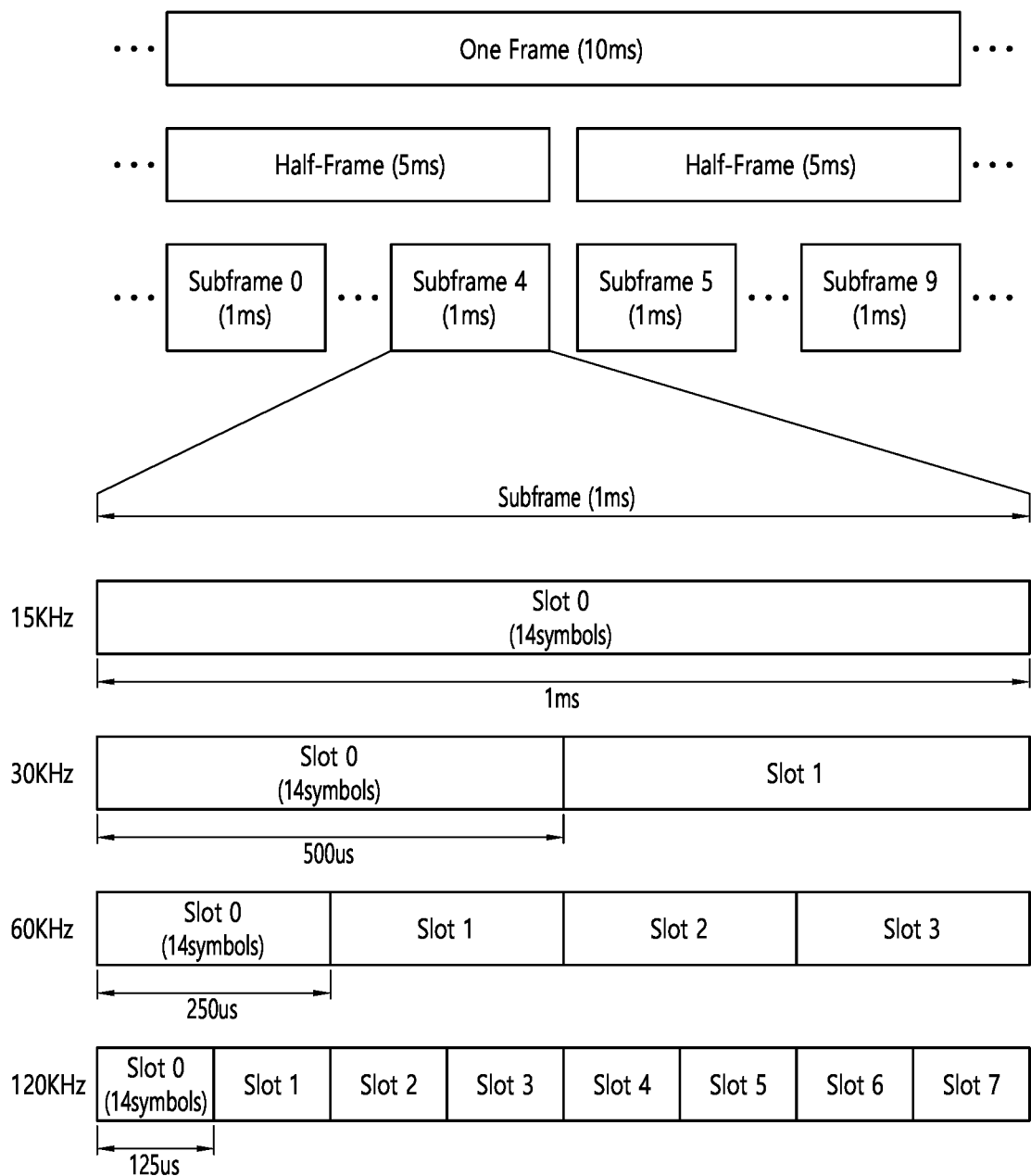
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
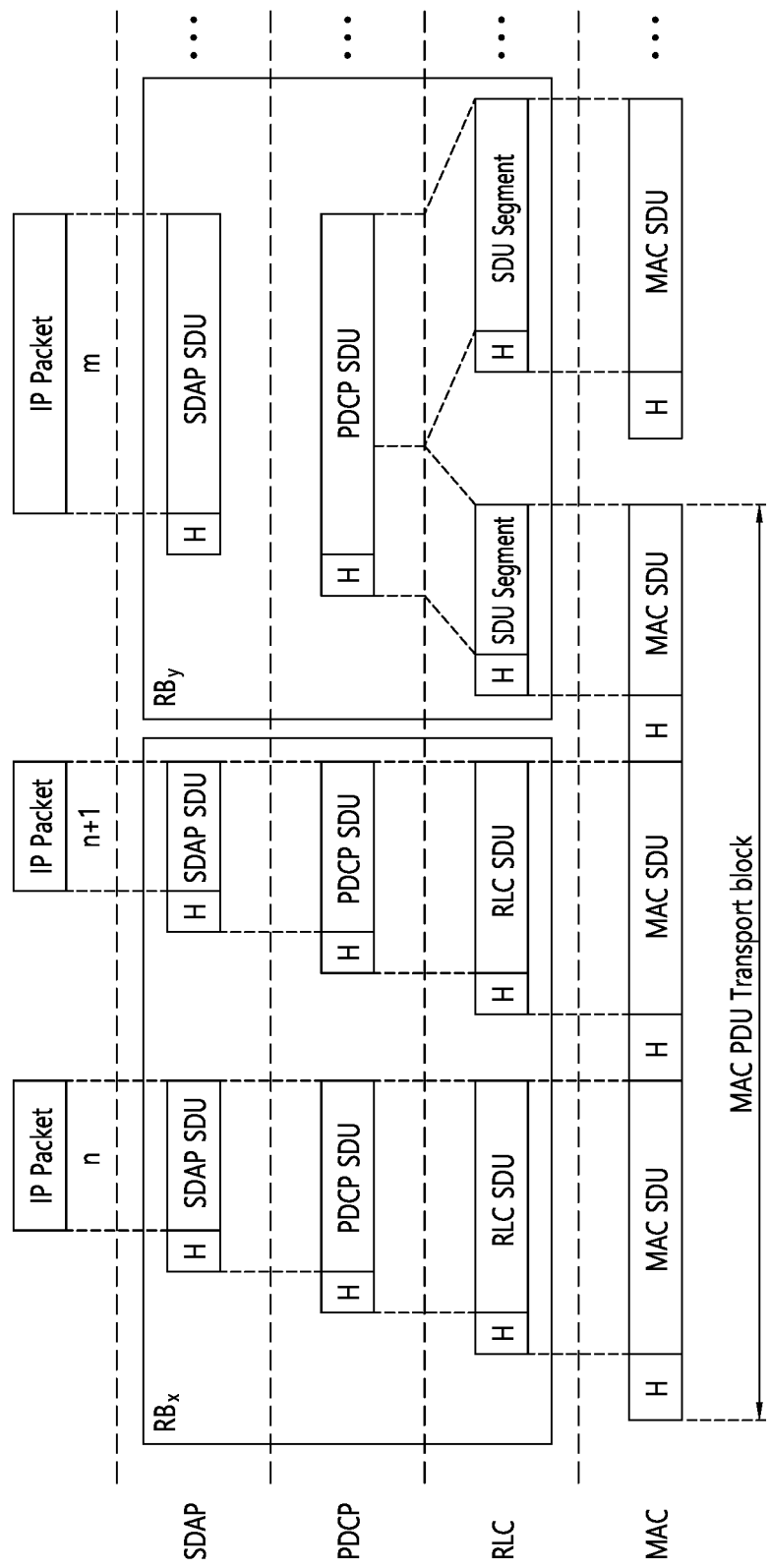
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, Bandwidth part is described. Section 4.4.5 of 3GPP TS 38.211 V15.7.0 may be referred.

A bandwidth part is a subset of contiguous common resource blocks for a given numerology in bandwidth part on a given carrier.

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Figure 10:
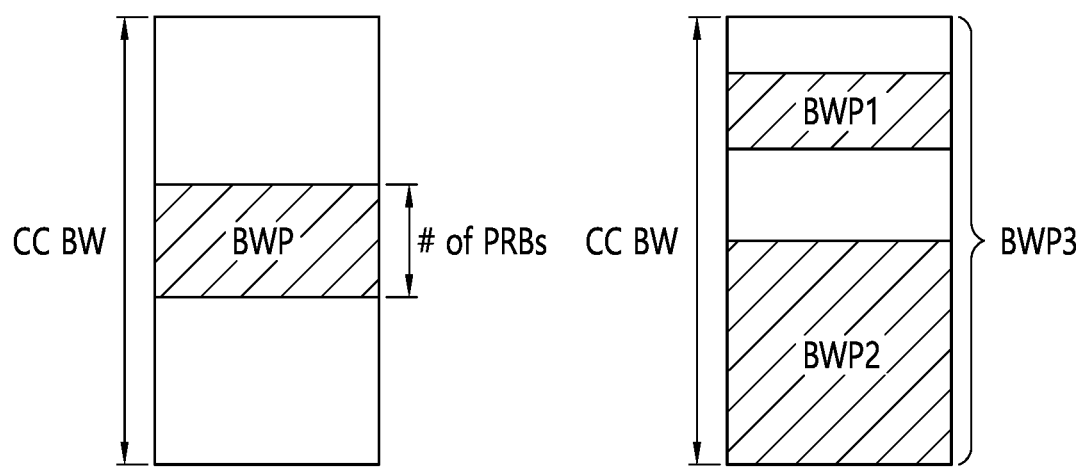
FIG. 10 shows an example of bandwidth part (BWP) configurations to which implementations of the present disclosure is applied.

FIG. 10 shows an example of bandwidth part (BWP) configurations to which implementations of the present disclosure is applied.

Referring to FIG. 10, BWP consists of a group of contiguous physical resource blocks (PRBs). The bandwidth (BW) of BWP cannot exceed the configured component carrier (CC) BW for the UE. The BW of the BWP must be at least as large as one synchronization signal (SS) block BW, but the BWP may or may not contain SS block. Each BWP is associated with a specific numerology, i.e., sub-carrier spacing (SCS) and cyclic prefix (CP) type. Therefore, the BWP is also a means to reconfigure a UE with a certain numerology.

As illustrated in the right figure of FIG. 10, the network can configure multiple BWPs to a UE via radio resource control (RRC) signaling, which may overlap in frequency. The granularity of BWP configuration is one PRB. For each serving cell, DL and UL BWPs are configured separately and independently for paired spectrum and up to four BWPs can be configured for DL and UL each. For unpaired spectrum, a DL BWP and a UL BWP are jointly configured as a pair and up to 4 pairs can be configured. There can be maximally 4 UL BWPs configured for a supplemental UL (SUL) as well.

Figure 11:
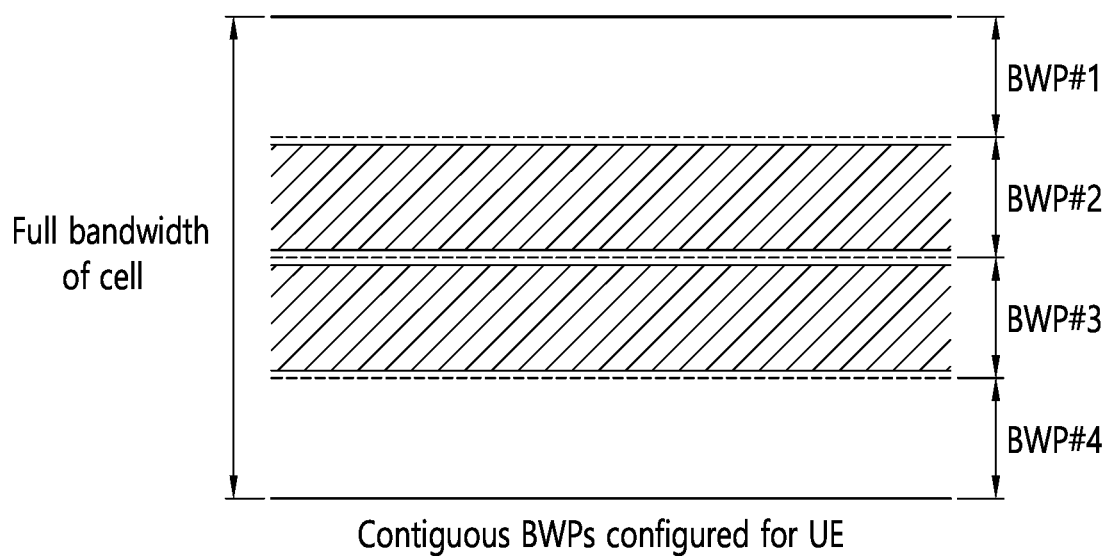
FIG. 11 shows an example of contiguous BWPs and non-contiguous BWPs to which implementations of the present disclosure is applied
Figure 11:
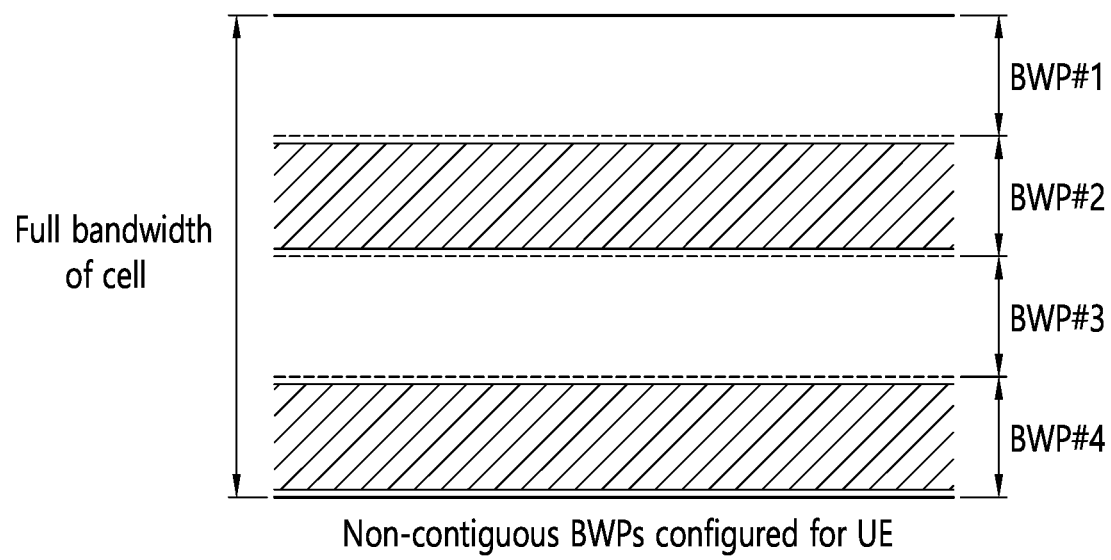

FIG. 11 shows an example of contiguous BWPs and non-contiguous BWPs to which implementations of the present disclosure is applied Referring to FIG. 11, for serving cell measurements, a UE may be configured with multiple BWPs contiguously or non-contiguously. In order to derive quality of the serving cell, the UE measures only configured BWPs, not all BWPs that belongs to the serving cell.

Each configured DL BWP includes at least one control resource set (CORESET) with UE-specific search space (USS). The USS is a searching space for UE to monitor possible reception of control information destined for the UE. In the primary carrier, at least one of the configured DL BWPs includes one CORESET with common search space (CSS). The CSS is a searching space for UE to monitor possible reception of control information common for all UEs or destined for the particular UE. If the CORESET of an active DL BWP is not configured with CSS, the UE is not required to monitor it. Note that UEs are expected to receive and transmit only within the frequency range configured for the active BWPs with the associated numerologies. However, there are exceptions. A UE may perform Radio Resource Management (RRM) measurement or transmit sounding reference signal (SRS) outside of its active BWP via measurement gap.

Figure 12:
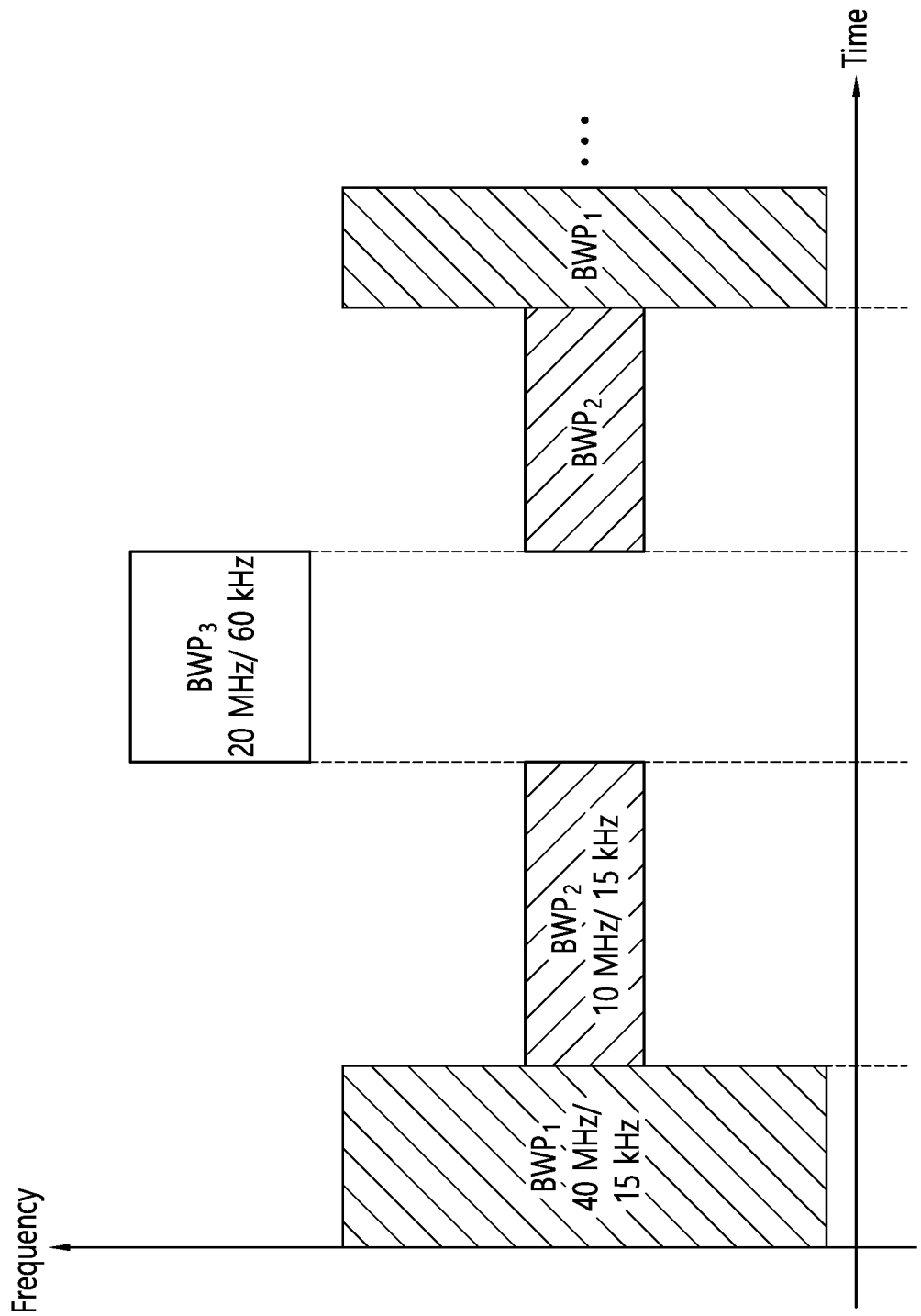
FIG. 12 shows an example of multiple BWPs to which implementations of the present disclosure is applied.

FIG. 12 shows an example of multiple BWPs to which implementations of the present disclosure is applied.

Referring to FIG. 12, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

The BWP is also a tool to switch the operating numerology of a UE. The numerology of the DL BWP configuration is used at least for the Physical Downlink Control Channel (PDCCH), Physical Downlink Shared Channel (PDSCH) and corresponding demodulation RS (DMRS). Likewise, the numerology of the UL BWP configuration is used at least for the Physical Uplink Control Channel (PUCCH), Physical Uplink Shared Channel (PUSCH) and corresponding DMRS. On the other hand, it is noted that there is a restriction in the configuration of numerology at least in the early version of NR. That is, the same numerology shall be used within the same PUCCH group including both DL and UL.

Hereinafter, radio link failure related actions is described. The operations described below could be applied to implementations of the present disclosure. Section 5.3.10 of 3GPP TS 38.331 V16.0.0 may be referred.

Detection of physical layer problems in RRC_CONNECTED is described.

The UE shall:
1> if dapsConfig is configured for any DRB, upon receiving N310 consecutive "out-of-sync" indications for the source from lower layers while T304 is running:
2> start timer T310 for the source.
1> upon receiving N310 consecutive "out-of-sync" indications for the SpCell from lower layers while neither T300, T301, T304, T311 nor T319 are running:
2> start timer T310 for the corresponding SpCell.

Recovery of physical layer problems is described.

Upon receiving N311 consecutive "in-sync" indications for the SpCell from lower layers while T310 is running, the UE shall:
1> stop timer T310 for the corresponding SpCell.
1> stop timer T312 for the corresponding SpCell, if running.

In this case, the UE maintains the RRC connection without explicit signalling, i.e. the UE maintains the entire radio resource configuration.

Periods in time where neither "in-sync" nor "out-of-sync" is reported by L1 do not affect the evaluation of the number of consecutive "in-sync" or "out-of-sync" indications.

Detection of radio link failure is described.

The UE shall:
1> if dapsConfig is configured for any DRB:
2> upon T310 expiry in source; or
2> upon random access problem indication from source MCG MAC; or
2> upon indication from source MCG RLC that the maximum number of retransmissions has been reached:
3> consider radio link failure to be detected for the source MCG i.e. source RLF;
4> suspend all DRBs in the source;
4> release the source connection.
1> else:
2> upon T310 expiry in PCell; or
2> upon T312 expiry in PCell; or
2> upon random access problem indication from MCG MAC while neither T300, T301, T304, T311 nor T319 are running; or
2> upon indication from MCG RLC that the maximum number of retransmissions has been reached; or
2> if connected as an IAB-node, upon BH RLF indication received on BAP entity from the MCG; or 2> upon indication of consistent uplink LBT failures from MCG MAC:
3> if the indication is from MCG RLC and CA duplication is configured and activated, and for the corresponding logical channel allowedServingCells only includes SCell(s):
4> initiate the failure information procedure to report RLC failure.
3> else:
4> consider radio link failure to be detected for the MCG i.e. RLF;
4> discard any segments of segmented RRC messages received;
4> store the following radio link failure information in the VarRLF-Report by setting its fields as follows:
5> clear the information included in VarRLF-Report, if any;
5> set the plmn-IdentityList to include the list of EPLMNs stored by the UE (i.e. includes the RPLMN);
5> set the measResultLastServCell to include the RSRP, RSRQ and the available SINR, of the source PCell based on the available SSB and CSI-RS measurements collected up to the moment the UE detected radio link failure;
5> set the ssbRLMConfigBitmap and/or csi-rsRLMConfigBitmap in measResultLastServCell to include the radio link monitoring configuration of the source PCell;
5> for each of the configured NR frequencies in which measurements are available:
6> if the SS/PBCH block-based measurement quantities are available:
7> set the measResultListNR in measResultNeighCells to include all the available measurement quantities of the best measured cells, other than the source PCell, ordered such that the cell with highest SS/PBCH block RSRP is listed first if SS/PBCH block RSRP measurement results are available, otherwise the cell with highest SS/PBCH block RSRQ is listed first if SS/PBCH block RSRQ measurement results are available, otherwise the cell with highest SS/PBCH block SINR is listed first, based on the available SS/PBCH block based measurements collected up to the moment the UE detected radio link failure;
8> for each neighbour cell included, include the optional fields that are available;
6> if the CSI-RS based measurement quantities are available:
7> set the measResultListNR in measResultNeighCells to include all the available measurement quantities of the best measured cells, other than the source PCell, ordered such that the cell with highest CSI-RS RSRP is listed first if CSI-RS RSRP measurement results are available, otherwise the cell with highest CSI-RS RSRQ is listed first if CSI-RS RSRQ measurement results are available, otherwise the cell with highest CSI-RS SINR is listed first, based on the available CSI-RS based measurements collected up to the moment the UE detected radio link failure;
8> for each neighbour cell included, include the optional fields that are available;
5> for each of the configured EUTRA frequencies in which measurements are available:
6> set the measResultListEUTRA in measResultNeighCells to include the best measured cells ordered such that the cell with highest RSRP is listed first if RSRP measurement results are available, otherwise the cell with highest RSRQ is listed first, and based on measurements collected up to the moment the UE detected radio link failure;

The measured quantities are filtered by the L3 filter as configured in the mobility measurement configuration. The measurements are based on the time domain measurement resource restriction, if configured. Blacklisted cells are not required to be reported.

5> if detailed location information is available, set the content of locationInfo as follows:
6> if available, set the commonLocationInfo to include the detailed location information;
6> if available, set the bt-LocationInfo in locationInfo to include the Bluetooth measurement results, in order of decreasing RSSI for Bluetooth beacons;
6> if available, set the wlan-LocationInfo in locationInfo to include the WLAN measurement results, in order of decreasing RSSI for WLAN APs;
6> if available, set the sensor-LocationInfo in locationInfo to include the sensor measurement results;
5> set the failedPCellId to the global cell identity and the tracking area code, if available, and otherwise to the physical cell identity and carrier frequency of the PCell where radio link failure is detected;
5> if an RRCReconfiguration message including the reconfigurationWithSync was received before the connection failure:
6> if the last RRCReconfiguration message including the reconfigurationWithSync concerned an intra NR handover:
7> include the previousPCellId and set it to the global cell identity and the tracking area code of the PCell where the last RRCReconfiguration message including reconfigurationWithSync was received;
7> set the timeConnFailure to the elapsed time since reception of the last RRCReconfiguration message including the reconfigurationWithSync;
5> set the connectionFailureType to rlf;
5> set the c-RNTI to the C-RNTI used in the PCell;
5> set the rlf-Cause to the trigger for detecting radio link failure;
5> if the rlf-Cause is set to randomAccessProblem or beamFailureRecoveryFailure:
6> set the absoluteFrequencyPointA to indicate the absolute frequency of the reference resource block associated to the random-access resources;
6> set the locationAndBandwidth and subcarrierSpacing associated to the UL BWP of the random-access resources;
6> set the msg1-FrequencyStart, msg1-FDM and msg1-SubcarrierSpacing associated to the random-access resources;
6> set the parameters associated to individual random-access attempt in the chronological order of attempts in the perRAInfoList as follows:
7> if the random-access resource used is associated to a SS/PBCH block, set the associated random-access parameters for the successive random-access attempts associated to the same SS/PBCH block for one or more radom-access attempts as follows:
8> set the ssb-Index to include the SS/PBCH block index associated to the used random-access resource;
8> set the numberOfPreamblesSentOnSSB to indicate the number of successive random access attempts associated to the SS/PBCH block;

8> for each random-access attempt performed on the random-access resource, include the following parameters in the chronological order of the random-access attempt:
9> if contention resolution was not successful for the transmitted preamble:
10> set the contentionDetected to true;
9> else:
10> set the contentionDetected to false;
9> if the SS/PBCH block RSRP of the SS/PBCH block corresponding to the random-access resource used in the random-access attempt is above rsrp-Threshold-SSB:
10> set the dlRSRPAboveThreshold to true;
9> else:
10> set the dlRSRPAboveThreshold to false;
7> else if the random-access resource used is associated to a CSI-RS, set the associated random-access parameters for the successive random-access attempts associated to the same CSI-RS for one or more radom-access attempts as follows:
8> set the csi-RS-Index to include the CSI-RS index associated to the used random-access resource;
8> set the numberOfPreamblesSentOnCSI-RS to indicate the number of successive random-access attempts associated to the CSI-RS;
8> for each random-access attempt performed on the random-access resource, include the following parameters in the chronological order of the random-access attempt:
9> if contention resolution was not successful for the transmitted preamble:
10> set the contentionDetected to true;
9> else:
10> set the contentionDetected to false;
9> if the CSI-RS RSRP of the CSI-RS corresponding to the random-access resource used in the random-access attempt is above rsrp-ThresholdCSI-RS:
10> set the dlRSRPAboveThreshold to true;
9> else:
10> set the dlRSRPAboveThreshold to false;
4> if AS security has not been activated:
5> perform the actions upon going to RRC_IDLE, with release cause 'other';
4> else if AS security has been activated but SRB2 and at least one DRB have not been setup:
5> perform the actions upon going to RRC_IDLE, with release cause 'RRC connection failure';
4> else:
5> if T316 is configured; and
5> if SCG transmission is not suspended; and
5> if PSCell change is not ongoing (i.e. timer T304 for the NR PSCell is not running in case of NR-DC or timer T307 of the E-UTRA PSCell is not running):
6> initiate the MCG failure information procedure to report MCG radio link failure.
5> else:
6> initiate the connection re-establishment procedure.
The UE may discard the radio link failure information, i.e. release the UE variable VarRLF-Report, 48 hours after the radio link failure is detected.
The UE shall:
1> upon T310 expiry in PSCell; or
1> upon T312 expiry in PSCell; or
1> upon random access problem indication from SCG MAC; or
1> upon indication from SCG RLC that the maximum number of retransmissions has been reached; or
1> if connected as an IAB-node, upon BH RLF failure indication received on BAP entity from the SCG;
1> upon indication of consistent uplink LBT failures from SCG MAC:
2> if the indication is from SCG RLC and CA duplication is configured and activated; and for the corresponding logical channel allowedServingCells only includes SCell(s):
3> initiate the failure information procedure to report RLC failure.
2> else if MCG transmission is not suspended:
3> consider radio link failure to be detected for the SCG, i.e. SCG RLF;
3> initiate the SCG failure information procedure to report SCG radio link failure.
2> else:
3> if the UE is in NR-DC:
4> initiate the connection re-establishment procedure;
3> else (the UE is in (NG)EN-DC):
4> initiate the connection re-establishment procedure;

Hereinafter, Radio link monitoring is described. The operations described below could be applied to implementations of the present disclosure. Section 5 of 3GPP TS 38.213 V16.1.0 may be referred.

The downlink radio link quality of the primary cell is monitored by a UE for the purpose of indicating out-of-sync/in-sync status to higher layers. The UE is not required to monitor the downlink radio link quality in DL BWPs other than the active DL BWP, on the primary cell. If the active DL BWP is the initial DL BWP and for SS/PBCH block and CORESET multiplexing pattern 2 or 3, the UE is expected to perform RLM using the associated SS/PBCH block when the associated SS/PBCH block index is provided by RadioLinkMonitoringRS.

If the UE is configured with a SCG, and the parameter rlf-TimersAndConstants is provided by higher layers and is not set to release, the downlink radio link quality of the PSCell of the SCG is monitored by the UE for the purpose of indicating out-of-sync/in-sync status to higher layers. The UE is not required to monitor the downlink radio link quality in DL BWPs other than the active DL BWP on the PSCell.

A UE can be configured for each DL BWP of a SpCell with a set of resource indexes, through a corresponding set of RadioLinkMonitoringRS, for radio link monitoring by failureDetectionResources. The UE is provided either a CSI-RS resource configuration index, by csi-RS-Index, or a SS/PBCH block index, by ssb-Index. The UE can be configured with up to $N_{LR-RLM}$ RadioLinkMonitoringRS for link recovery procedures, and for radio link monitoring. From the $N_{LR-RLM}$ RadioLinkMonitoringRS, up to $N_{RLM}$ RadioLinkMonitoringRS can be used for radio link monitoring, and up to two RadioLinkMonitoringRS can be used for link recovery procedures.

For operation with shared spectrum channel access, when a UE is provided a SS/PBCH block index by ssb-Index, the UE is expected to perform radio link monitoring using SS/PBCH block(s) in the discovery burst transmission window.

If the UE is not provided RadioLinkMonitoringRS and the UE is provided for PDCCH receptions TCI states that include one or more of a CSI-RS the UE uses for radio link monitoring the RS provided for the active TCI state for PDCCH reception if the active TCI state for PDCCH reception includes only one RS if the active TCI state for PDCCH reception includes two RS, the UE expects that one RS has QCL-TypeD and the UE uses the RS with QCL-TypeD for radio link monitoring; the UE does not expect both RS to have QCL-TypeD the UE is not required to use for radio link monitoring an aperiodic or semi-persistent RS For $L_{max}$=4, the UE selects the $N_{RLM}$ RS provided for active TCI states for PDCCH receptions in CORESETs associated with the search space sets in an order from the shortest monitoring periodicity. If more than one CORESETs are associated with search space sets having same monitoring periodicity, the UE determines the order of the CORESET from the highest CORESET index.

A UE does not expect to use more than $N_{RLM}$ RadioLinkMonitoringRS for radio link monitoring when the UE is not provided RadioLinkMonitoringRS.

Values of $N_{LR-RLM}$ and $N_{RLM}$ for different values of $L_{max}$ are given in Table 5-1.

Table 5 shows $N_{LR-RLM}$ and $N_{RLM}$ as a function of maximum number $L_{max}$ of SS/PBCH blocks per half frame.

TABLE 5

| $L_{max}$ | $N_{LR-RLM}$ | $N_{RLM}$ |
|---|---|---|
| 4 | 2 | 2 |
| 8 | 6 | 4 |
| 64 | 8 | 8 |

For a CSI-RS resource configuration, powerControlOffsetSS is not applicable and a UE expects to be provided only 'noCDM' from cdm-Type, only 'one' and 'three' from density, and only '1 port' from nrofPorts.

If a UE is configured with multiple DL BWPs for a serving cell, the UE performs RLM using the RS(s) corresponding to resource indexes provided by RadioLinkMonitoringRS for the active DL BWP or, if RadioLinkMonitoringRS is not provided for the active DL BWP, using the RS(s) provided for the active TCI state for PDCCH receptions in CORESETs on the active DL BWP.

In non-DRX mode operation, the physical layer in the UE assesses once per indication period the radio link quality, evaluated over the previous time period against thresholds ($Q_{out}$ and $Q_{in}$) configured by rlmInSyncOutOfSyncThreshold. The UE determines the indication period as the maximum between the shortest periodicity for radio link monitoring resources and 10 msec.

In DRX mode operation, the physical layer in the UE assesses once per indication period the radio link quality, evaluated over the previous time period, against thresholds ($Q_{out}$ and $Q_{in}$) provided by rlmInSyncOutOfSyncThreshold. The UE determines the indication period as the maximum between the shortest periodicity for radio link monitoring resources and the DRX period.

The physical layer in the UE indicates, in frames where the radio link quality is assessed, out-of-sync to higher layers when the radio link quality is worse than the threshold $Q_{out}$ for all resources in the set of resources for radio link monitoring. When the radio link quality is better than the threshold $Q_{in}$ for any resource in the set of resources for radio link monitoring, the physical layer in the UE indicates, in frames where the radio link quality is assessed, in-sync to higher layers.

Meanwhile, if a single bandwidth part (BWP) is activated, a wireless device may perform radio link monitoring (RLM) for the single active BWP. A wireless device may declare the radio link failure (RLF) and initiate the recovery procedure (for example, RRC re-establishment), when the wireless device detects the radio link problem for the active BWP.

It may be supported to activate multiple BWPs. When multiple BWPs are activated, a wireless device may need to perform RLM for each activated BWP. If a wireless device declares the RLF when the radio link problem is detected from an active BWP (for example, first active BWP), even though there is another available active BWP (for example, second active BWP), the wireless device will undergo unnecessary service interruption due to the recovery procedure whenever the radio link problem happens within a single BWP.

Therefore, studies for Radio Link Monitoring for multiple active bandwidth parts in a wireless communication system are required.

Hereinafter, a method for Radio Link Monitoring for multiple active bandwidth parts in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 13:
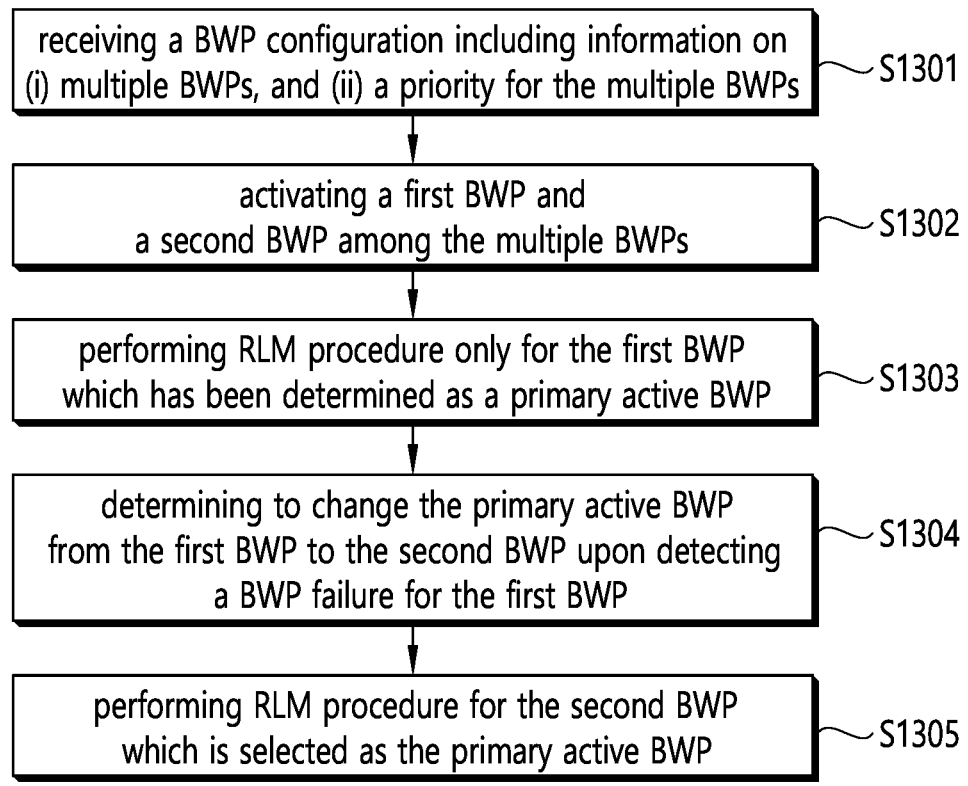
FIG. 13 shows an example of a method for Radio Link Monitoring for multiple active bandwidth parts in a wireless communication system, according to some embodiments of the present disclosure.

FIG. 13 shows an example of a method for Radio Link Monitoring for multiple active bandwidth parts in a wireless communication system, according to some embodiments of the present disclosure.

In particular, FIG. 13 shows an example of a method performed by a wireless device.

In step S1301, a wireless device may receive a Bandwidth Part (BWP) configuration including information on (i) multiple BWPs, and (ii) a priority for the multiple BWPs.

In step S1302, a wireless device may activate a first BWP and a second BWP among the multiple BWPs.

For example, a wireless device may activate plurality of BWPs among the multiple BWPs. For example, a wireless device may activate more than two BWPs among the multiple BWPs In step S1303, a wireless device may perform Radio Link Monitoring (RLM) procedure only for the first BWP which has been determined as a primary active BWP.

In step S1304, a wireless device may determine to change the primary active BWP from the first BWP to the second BWP upon detecting a BWP failure for the first BWP. The second BWP may be selected based on the information on the priority for the multiple BWPs.

According to some embodiments of the present disclosure, a wireless device may deactivate (and/or release) the first BWP, upon detecting the BWP failure for the first BWP.

In step S1305, a wireless device may perform RLM procedure for the second BWP which is selected as the primary active BWP.

According to some embodiments of the present disclosure, a wireless device may transmit, to a network, a BWP failure information informing the BWP failure for the first BWP.

For example, the BWP failure information may be transmitted via the second BWP.

For example, the BWP failure information may include a BWP identity of the first BWP.

For example, the BWP failure information may include a cause of the BWP failure for the first BWP. For example, the cause of the BWP failure may include at least one of (i) a Medium Access Control (MAC) layer problem, (ii) Radio Link Control (RLC) layer problem, and/or (iii) a Physical (PHY) layer problem.

According to some embodiments of the present disclosure, a wireless device may initiate a random access procedure for the first BWP, before detecting the BWP failure for the first BWP (for example, before step S1304).

A wireless device may stop the random access procedure for the first BWP, upon detecting the BWP failure for the first BWP.

In this case, a wireless device may initiate another random access procedure for the second BWP, after changing the primary active BWP from the first BWP to the second BWP (for example, after step S1304).

According to some embodiments of the present disclosure, a wireless device may consider and declare a radio link failure, based on detecting a BWP failure for all activate BWPs among the multiple BWPs.

For example, in case that only the first BWP and the second BWP are activated, the wireless device may consider the radio link failure, based on (i) detecting the BWP failure on the first BWP by performing RLM on the first BWP in step S1303, and (ii) detecting a BWP failure on the second BWP by performing RLM on the second BWP in step S1305.

According to some embodiments of the present disclosure, the wireless device may be in communication with at least one of a user equipment, a network, or an autonomous vehicle other than the wireless device.

Hereinafter, operations for a method of Radio Link Monitoring (RLM) for multiple active bandwidth parts (BWPs) in a wireless communication system are described.

According to some embodiments of the present disclosure, UE may perform the Radio Link Monitoring only for a single active BWP (for example, primary active BWP), at a time when more than one BWPs are activated. When the link problem is detected for the primary active BWP, UE may change the primary active BWP to another active BWP.

When to change the primary active BWP (BWP failure) is described.

According to some embodiments of the present disclosure, upon detection of the BWP failure for the primary active BWP, UE may switch the primary active BWP to another active BWP.

For example, upon receiving an indication from lower layers (for example, RLC, MAC, or PHY layer), RRC layer may consider the BWP failure is detected for the primary active BWP and determine and/or decide to change the primary active BWP to another active BWP.

For example, RLC layer may send the indication to RRC layer when the maximum number of retransmissions is reached.

For example, MAC layer may send the indication to RRC layer when the RACH procedure fails for N-consecutive times.

For example, UE may consider the BWP failure is detected for the primary active BWP and determine/decide to change the primary active BWP to another active BWP, when the measurement result of the primary active BWP is lower than a threshold.

For example, UE may consider the BWP failure is detected for the primary active BWP and determine/decide to change the primary active BWP to another active BWP, when the physical layer problem is detected from the primary active BWP based on the measurement result, for example, upon receiving N-consecutive "out-of-sync" indications from physical layer for the primary active BWP, or upon expiry of radio link problem timer (for example, T310) for the primary active BWP. UE may start the radio link problem timer for the primary active BWP upon receiving N-consecutive "out-of-sync" indications from physical layer for the primary active BWP.

How to select the primary active BWP is described.

According to some embodiments of the present disclosure, the first (for example, an initial) primary active BWP may be set by network.

According to some embodiments of the present disclosure, upon detection of the BWP failure for the primary active BWP, UE may switch the primary active BWP to an active BWP configured with RLM and for which BWP failure has not been detected.

For example, the BWP list configured with RLM may be provided to UE. UE may switch the primary active BWP based on the BWP list. For example, the UE may select an active BWP among active BWPs that belong to the BWP list as the new primary active BWP. That is, UE may not consider BWP not included in the BWP list as the primary active BWP.

For example, the BWP priority for RLM can be provided to UE. UE may switch the primary active BWP based on the BWP priority for RLM. For example, UE may select an active BWP that has the highest BWP priority among active BWPs for which the BWP failure has not been detected as the new primary active BWP.

For example, when UE switches the primary active BWP, the UE may select the new primary active BWP based on the measurement results, for example, Reference Signals Received Power (RSRP), Reference Signal Received Quality (RSRQ), Received Signal Strength Indicator (RSSI) or Channel occupancy measurements. For example, UE may select an active BWP that has the highest or lowest measurement results as the new primary active BWP.

BWP failure indication is described.

According to some embodiments of the present disclosure, when the BWP failure is detected for the primary active BWP, UE may send the BWP failure information to the network.

For example, the BWP failure information may include the BWP identity for which the BWP failure has been detected.

For example, the BWP failure information may include the BWP failure cause, for example, MAC problem (for example, the RACH procedure fails for N-consecutive times), RLC problem (for example, maximum number of retransmissions is reached) and/or PHY problem (for example, upon receiving N-consecutive "out-of-sync" indications from physical layer and/or upon expiry of radio link problem timer, for example, T310).

For example, the BWP failure information may be transmitted to the network via active BWP for which the BWP failure has not been detected (for example, new primary active BWP). The BWP failure information may be transmitted to the network via MAC control element.

According to some embodiments of the present disclosure, UE may deactivate and/or release the active BWP for which the BWP failure is detected.

RACH related behaviour is described.

According to some embodiments of the present disclosure, if there is ongoing random access procedure in the primary active BWP when the BWP failure is detected for the primary active BWP, UE may stop the ongoing random access procedure for the primary active BWP. After that, UE may initiate a random access procedure on another active BWP configured with TRACH occasion and for which BWP failure has not been detected.

Detection of Radio Link Failure is described.

According to some embodiments of the present disclosure, UE may consider radio link failure to be detected for a serving cell or cell group that the serving cell belongs to, if the BWP failure has been detected for all active BWPs which belong to the serving cell.

According to some embodiments of the present disclosure, UE may start the RLF timer (for example, T310), for a serving cell or cell group that the serving cell belongs to, if the BWP failure has been detected for all active BWPs which belong to the serving cell. Upon expiry of the RLF timer, UE may consider radio link failure to be detected for a serving cell or cell group that the serving cell belongs to.

According to some embodiments of the present disclosure, when the BWP failure is detected for a primary active BWP if the BWP failure has not been detected for all other active BWPs. For example, if the primary BWP is the first active BWP that the BWP failure has been detected, UE may start the RLF timer, Upon expiry of the RLF timer, UE may consider radio link failure to be detected for a serving cell or cell group that the serving cell belongs to.

A method of Radio Link Monitoring (RLM) for multiple active bandwidth parts (BWPs) performed by a wireless device in a wireless communication system is described.

For example, a wireless device may receive a configuration of multiple bandwidth parts (BWPs). A wireless device may activating one or more BWPs including a first active bandwidth part (BWP) among the multiple BWPs. A wireless device may perform Radio Link Monitoring for the first active BWP. A wireless device may detect the BWP failure for the first active BWP. A wireless device may selecting a second active BWP among the one or more active BWPs. A wireless device may performing Radio Link Monitoring for the second active BWP.

Figure 14:
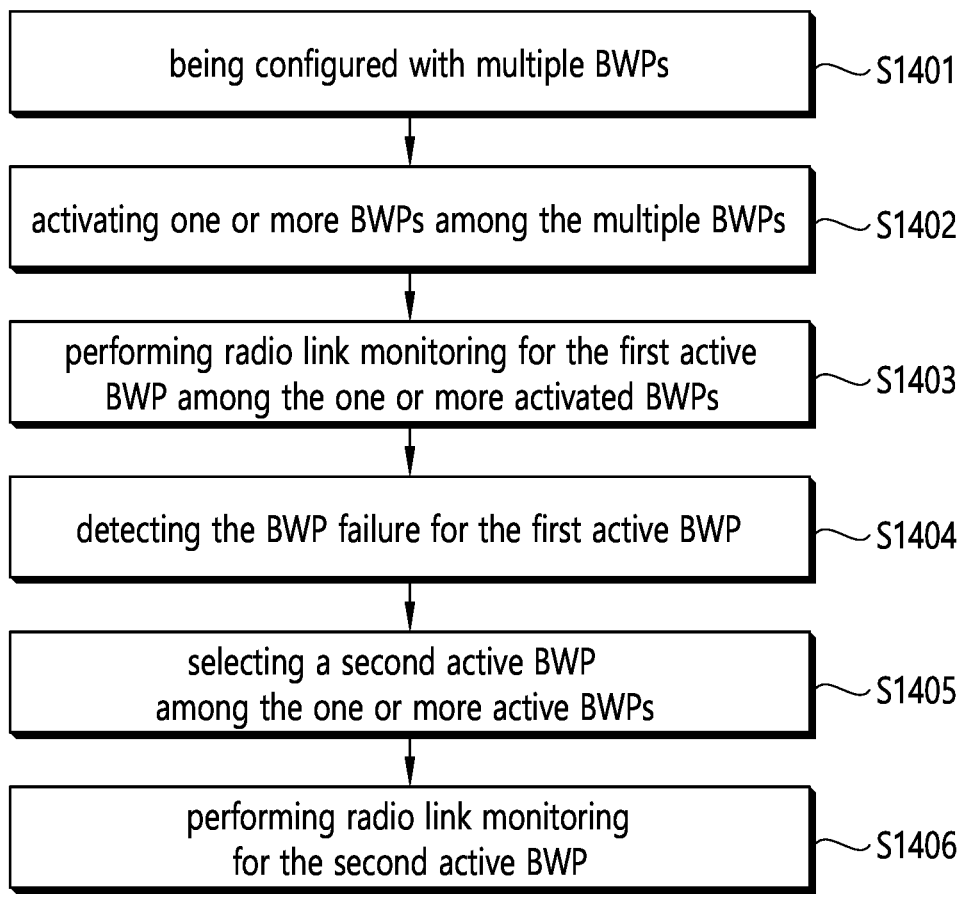
FIG. 14 shows an example of a method for Radio Link Monitoring (RLM) for multiple active bandwidth parts performed by a User Equipment (UE) in a wireless communication system, according to some embodiments of the present disclosure.

FIG. 14 shows an example of a method for Radio Link Monitoring (RLM) for multiple active bandwidth parts performed by a User Equipment (UE) in a wireless communication system, according to some embodiments of the present disclosure.

In step S1401, UE may be configured with multiple BWPs. A configuration for the multiple BWPs may be received from the network.

In step S1402, UE may activate one or more BWPs among the multiple BWPs.

In step S1403, UE may perform radio link monitoring for the first active BWP among the one or more activated BWPs. The first active BWP may be set by the network. The first active BWP may be a primary active BWP.

In step S1404, UE may detect the BWP failure for the first active BWP. For example, upon an indication from lower layers (for example, RLC, MAC, and/or PHY layer), UE (for example, RRC layer of UE) may detected the BWP failure for the first active BWP.

In step S1405, UE may select a second active BWP among the one or more active BWPs. For example, upon detecting the BWP failure for the first active BWP, (1) UE may select the second active BWP as the new primary active BWP, and/or (2) UE may determine/decide to change the primary active BWP from the first active BWP to the second active BWP.

For example, the second active BWP may be an active BWP configured with RLM and for which BWP failure has not been detected among active BWPs.

For example, the second active BWP may be an active BWP that belongs to a BWP list configured with RLM. The BWP list may be provided to UE.

For example, the second active BWP may be an active BWP that has the highest BWP priority for RLM among active BWPs. The BWP priority may be provided to UE.

For example, the second active BWP may be an active BWP that the highest or lowest measurement results among active BWPs.

In step S1406, UE may perform radio link monitoring for the second active BWP.

Hereinafter, an apparatus for Radio Link Monitoring for multiple active bandwidth parts in a wireless communication system, according to some embodiments of the present disclosure, will be described. Herein, the apparatus may be a wireless device (100 or 200) in FIGS. 2, 3, and 5.

For example, a wireless device may perform methods described in FIGS. 13 to 15. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to receive a Bandwidth Part (BWP) configuration including information on (i) multiple BWPs, and (ii) a priority for the multiple BWPs. The processor 102 may be configured to activate a first BWP and a second BWP among the multiple BWPs. The processor 102 may be configured to perform Radio Link Monitoring (RLM) procedure only for the first BWP which has been determined as a primary active BWP. The processor 102 may be configured to determine to change the primary active BWP from the first BWP to the second BWP upon detecting a BWP failure for the first BWP. The second BWP may be selected based on the information on the priority for the multiple BWPs. The processor 102 may be configured to perform RLM procedure for the second BWP which is selected as the primary active BWP.

According to some embodiments of the present disclosure, the processor 102 may be configured to control the transceiver 106 to transmit, to a network, a BWP failure information informing the BWP failure for the first BWP.

For example, the BWP failure information may be transmitted via the second BWP.

For example, the BWP failure information may include a BWP identity of the first BWP.

For example, the BWP failure information may include a cause of the BWP failure for the first BWP. For example, the cause of the BWP failure may include at least one of (i) a Medium Access Control (MAC) layer problem, (ii) Radio Link Control (RLC) layer problem, and/or (iii) a Physical (PHY) layer problem.

According to some embodiments of the present disclosure, the processor 102 may be configured to deactivate the first BWP, upon detecting the BWP failure for the first BWP.

According to some embodiments of the present disclosure, the processor 102 may be configured to initiate a random access procedure for the first BWP. The processor 102 may be configured to stop the random access procedure for the first BWP, upon detecting the BWP failure for the first BWP.

In this case, the processor 102 may be configured to initiate another random access procedure for the second BWP, after changing the primary active BWP from the first BWP to the second BWP.

According to some embodiments of the present disclosure, the processor 102 may be configured to declaring a radio link failure, based on detecting a BWP failure for all activate BWPs among the multiple BWPs.

According to some embodiments of the present disclosure, the processor 102 may be configured to be in communication with at least one of a user equipment, a network, or an autonomous vehicle other than the wireless device.

Hereinafter, a processor for a wireless device for Radio Link Monitoring for multiple active bandwidth parts in a wireless communication system, according to some embodiments of the present disclosure, will be described.

The processor may be configured to control the wireless device to receive a Bandwidth Part (BWP) configuration including information on (i) multiple BWPs, and (ii) a priority for the multiple BWPs. The processor may be configured to control the wireless device to activate a first BWP and a second BWP among the multiple BWPs. The processor may be configured to control the wireless device to perform Radio Link Monitoring (RLM) procedure only for the first BWP which has been determined as a primary active BWP. The processor may be configured to control the wireless device to determine to change the primary active BWP from the first BWP to the second BWP upon detecting a BWP failure for the first BWP. The second BWP may be selected based on the information on the priority for the multiple BWPs. The processor may be configured to control the wireless device to perform RLM procedure for the second BWP which is selected as the primary active BWP.

According to some embodiments of the present disclosure, the processor may be configured to control the wireless device to transmit, to a network, a BWP failure information informing the BWP failure for the first BWP.

For example, the BWP failure information may be transmitted via the second BWP.

For example, the BWP failure information may include a BWP identity of the first BWP.

For example, the BWP failure information may include a cause of the BWP failure for the first BWP. For example, the cause of the BWP failure may include at least one of (i) a Medium Access Control (MAC) layer problem, (ii) Radio Link Control (RLC) layer problem, and/or (iii) a Physical (PHY) layer problem.

According to some embodiments of the present disclosure, the processor may be configured to control the wireless device to deactivate the first BWP, upon detecting the BWP failure for the first BWP.

According to some embodiments of the present disclosure, the processor may be configured to control the wireless device to initiate a random access procedure for the first BWP. The processor may be configured to control the wireless device to stop the random access procedure for the first BWP, upon detecting the BWP failure for the first BWP.

In this case, the processor may be configured to control the wireless device to initiate another random access procedure for the second BWP, after changing the primary active BWP from the first BWP to the second BWP.

According to some embodiments of the present disclosure, the processor may be configured to control the wireless device to declaring a radio link failure, based on detecting a BWP failure for all activate BWPs among the multiple BWPs.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for Radio Link Monitoring for multiple active bandwidth parts in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive a Bandwidth Part (BWP) configuration including information on (i) multiple BWPs, and (ii) a priority for the multiple BWPs. The stored a plurality of instructions may cause the wireless device to activate a first BWP and a second BWP among the multiple BWPs. The stored a plurality of instructions may cause the wireless device to perform Radio Link Monitoring (RLM) procedure only for the first BWP which has been determined as a primary active BWP. The stored a plurality of instructions may cause the wireless device to determine to change the primary active BWP from the first BWP to the second BWP upon detecting a BWP failure for the first BWP. The second BWP may be selected based on the information on the priority for the multiple BWPs. The stored a plurality of instructions may cause the wireless device to perform RLM procedure for the second BWP which is selected as the primary active BWP.

According to some embodiments of the present disclosure, the stored a plurality of instructions may cause the wireless device to transmit, to a network, a BWP failure information informing the BWP failure for the first BWP.

For example, the BWP failure information may be transmitted via the second BWP.

For example, the BWP failure information may include a BWP identity of the first BWP.

For example, the BWP failure information may include a cause of the BWP failure for the first BWP. For example, the cause of the BWP failure may include at least one of (i) a Medium Access Control (MAC) layer problem, (ii) Radio Link Control (RLC) layer problem, and/or (iii) a Physical (PHY) layer problem.

According to some embodiments of the present disclosure, the stored a plurality of instructions may cause the wireless device to deactivate the first BWP, upon detecting the BWP failure for the first BWP.

According to some embodiments of the present disclosure, the stored a plurality of instructions may cause the wireless device to initiate a random access procedure for the first BWP. The stored a plurality of instructions may cause the wireless device to stop the random access procedure for the first BWP, upon detecting the BWP failure for the first BWP.

In this case, the stored a plurality of instructions may cause the wireless device to initiate another random access procedure for the second BWP, after changing the primary active BWP from the first BWP to the second BWP.

According to some embodiments of the present disclosure, the stored a plurality of instructions may cause the wireless device to declaring a radio link failure, based on detecting a BWP failure for all activate BWPs among the multiple BWPs.

According to some embodiments of the present disclosure, the stored a plurality of instructions may cause the wireless device to be in communication with at least one of a user equipment, a network, or an autonomous vehicle other than the wireless device.

Hereinafter, a method for Radio Link Monitoring for multiple active bandwidth parts in a wireless communication system performed by a base station (BS), according to some embodiments of the present disclosure, will be described.

The BS may transmit, to a wireless device, a Bandwidth Part (BWP) configuration including information on (i) multiple BWPs, and (ii) a priority for the multiple BWPs. The BS may activate a first BWP and a second BWP among the multiple BWPs. The BS may receive, from a wireless device via the second active BWP, a BWP failure information informing a BWP failure for the first active BWP.

Hereinafter, a base station (BS) for Radio Link Monitoring for multiple active bandwidth parts in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, a Bandwidth Part (BWP) configuration including information on (i) multiple BWPs, and (ii) a priority for the multiple BWPs. The processor may be configured to activate a first BWP and a second BWP among the multiple BWPs. The processor may be configured to control the transceiver to receive, from a wireless device via the second active BWP, a BWP failure information informing a BWP failure for the first active BWP.

The present disclosure can have various advantageous effects.

According to some embodiments of the present disclosure, a wireless device could perform Radio Link Monitoring (RLM) for multiple active bandwidth parts efficiently.

For example, when more than one BWPs are activated, the power consumption required for RLM could be minimized by performing the RLM only for the primary active BWP.

For example, when the link problem is detected from an active BWP, a wireless device may not need to initiate the recovery procedure, for example, RRC re-establishment, by changing the primary active BWP.

For example, a wireless device may inform the network of the problem so that new active BWP can be configured for the wireless device by network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
receiving a Bandwidth Part (BWP) configuration including information on (i) multiple BWPs, and (ii) a priority for the multiple BWPs;
activating a first BWP and a second BWP among the multiple BWPs;
performing Radio Link Monitoring (RLM) procedure only for the first BWP which has been determined as a primary active BWP;
initiating a first random access procedure for the first BWP;
determining to change the primary active BWP from the first BWP to the second BWP upon detecting a BWP failure for the first BWP, wherein the second BWP is selected based on the information on the priority for the multiple BWPs;
stopping the first random access procedure for the first BWP, upon detecting the BWP failure for the first BWP;
performing RLM procedure for the second BWP which is selected as the primary active BWP;
initiating a second random access procedure for the second BWP, after changing the primary active BWP from the first BWP to the second BWP; and
transmitting a BWP failure information informing the BWP failure for the first BWP via the second BWP, after completing the second random access procedure.

2. The method of claim 1, wherein the BWP failure information includes a BWP identity of the first BWP.

3. The method of claim 1, wherein the BWP failure information includes a cause of the BWP failure for the first BWP.

4. The method of claim 3, wherein the cause of the BWP failure includes at least one of (i) a Medium Access Control (MAC) layer problem, (ii) Radio Link Control (RLC) layer problem, and/or (iii) a Physical (PHY) layer problem.

5. The method of claim 1, wherein the method further comprises, deactivating the first BWP, upon detecting the BWP failure for the first BWP.

6. The method of claim 1, wherein the method further comprises, declaring a radio link failure, based on detecting a BWP failure for all activate BWPs among the multiple BWPs.

7. The method of claim 1, wherein the wireless device is in communication with at least one of a user equipment, a network, or an autonomous vehicle other than the wireless device.

8. A wireless device in a wireless communication system comprising:
 a transceiver;
 a memory; and
 at least one processor operatively coupled to the transceiver and the memory, and configured to:
  activate a first BWP and a second BWP among the multiple BWPs;
  perform Radio Link Monitoring (RLM) procedure only for the first BWP which has been determined as a primary active BWP;
  initiate a first random access procedure for the first BWP;
  determine to change the primary active BWP from the first BWP to the second BWP upon detecting a BWP failure for the first BWP, wherein the second BWP is selected based on the information on the priority for the multiple BWPs;
  stop the first random access procedure for the first BWP, upon detecting the BWP failure for the first BWP;
  perform RLM procedure for the second BWP which is selected as the primary active BWP;
  initiate a second random access procedure for the second BWP, after changing the primary active BWP from the first BWP to the second BWP; and
  transmit a BWP failure information informing the BWP failure for the first BWP via the second BWP, after completing the second random access procedure.

9. A processor for a wireless device in a wireless communication system, wherein the processor is configured to control the wireless device to perform operations comprising:
 activating a first BWP and a second BWP among the multiple BWPs;
 performing Radio Link Monitoring (RLM) procedure only for the first BWP which has been determined as a primary active BWP;
 initiating a first random access procedure for the first BWP;
 determining to change the primary active BWP from the first BWP to the second BWP upon detecting a BWP failure for the first BWP, wherein the second BWP is selected based on the information on the priority for the multiple BWPs; and
 stopping the first random access procedure for the first BWP, upon detecting the BWP failure for the first BWP;
 performing RLM procedure for the second BWP which is selected as the primary active BWP;
 initiating a second random access procedure for the second BWP, after changing the primary active BWP from the first BWP to the second BWP; and
 transmitting a BWP failure information informing the BWP failure for the first BWP via the second BWP, after completing the second random access procedure.

\* \* \* \* \*